Sept. 1, 1925.  
J. O. ELLINGSON  
1,552,127
PROJECTION FILM HOLDER
Filed July 13, 1923
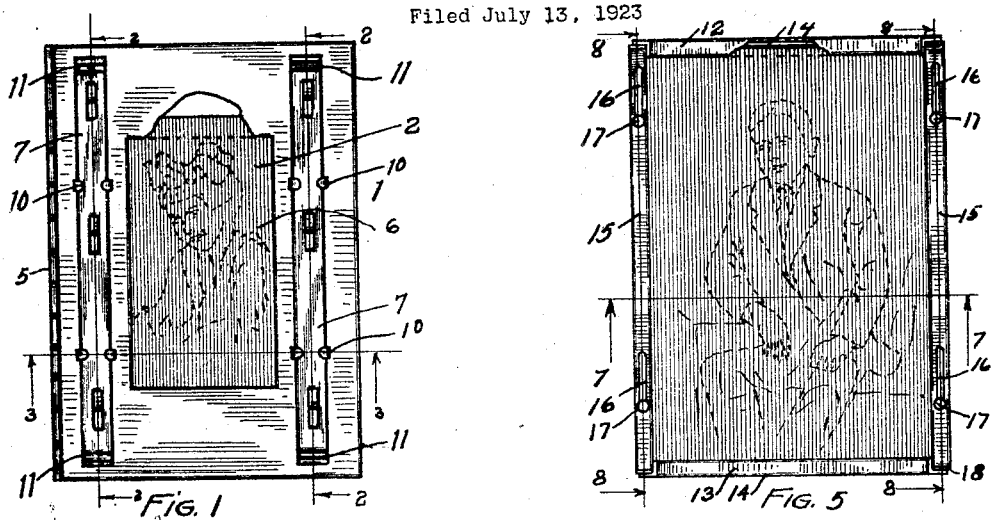
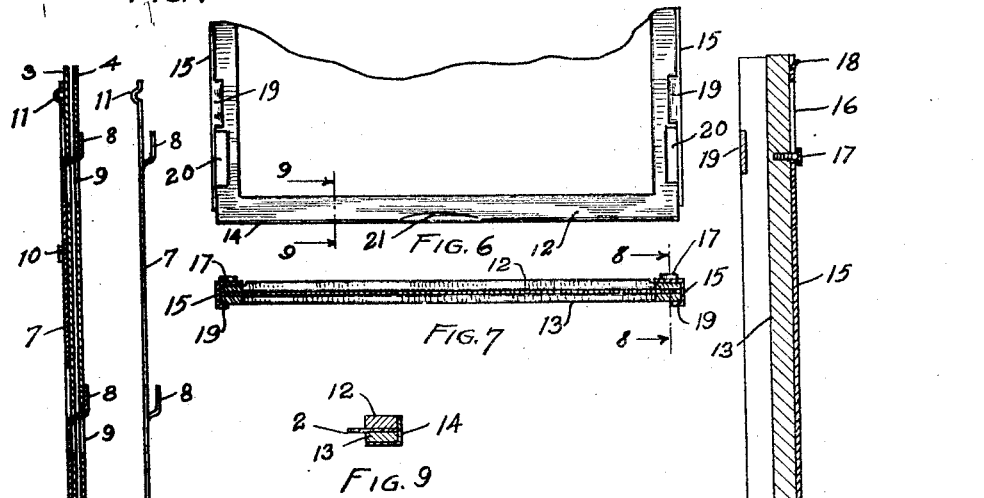
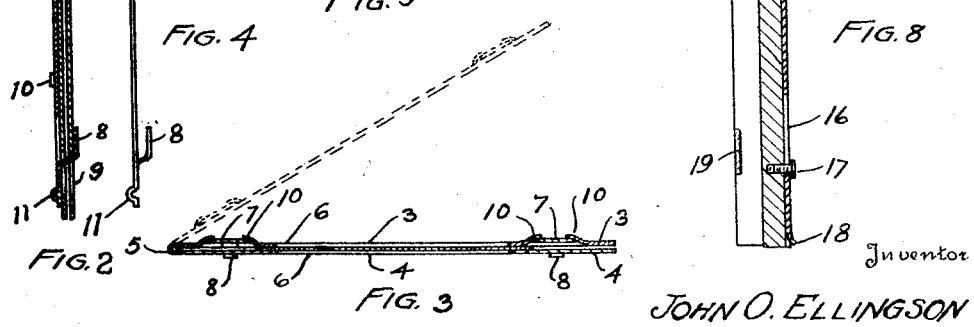
Inventor
JOHN O. ELLINGSON
By A. J. O'Brien
Attorney Patented Sept. 1, 1925.

1,552,127

UNITED STATES PATENT OFFICE.

JOHN O. ELLINGSON, OF DENVER, COLORADO.

PROJECTION FILM HOLDER.

Application filed July 13, 1923. Serial No. 651,268.

*To all whom it may concern:*

Be it known that I, JOHN O. ELLINGSON, citizen of the United States, residing at Denver, the city and county of Denver and State of Colorado, have invented certain new and useful Improvements in Projection Film Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to projection film holders and has reference, more specifically, to frames for holding a film negative in an enlarging camera.

It is common among photographers to make enlargements from such negatives as are suitable for this. These enlarged pictures are several times larger than the original negative and are produced by means of a projecting device, by means of which the picture on the negative is projected onto a sensitized paper.

When the negative is on a plate, this is merely secured to a suitable holder by springs or other suitable means. If the negative is on a film, as is now almost invariably the case, then means must be provided for holding the film straight.

In enlarging pictures from films, it is customary to place the film between two glass plates of proper size and then to place the combined glass plates and film into the holder of the enlarging camera. The use of glass plates for holding the film straight is objectionable for several reasons, the three most important objections being: first, because it requires more time and labor to mount the film, second, because the glass plates must be kept scrupulously clean, which is a great task, as they are so susceptible to finger prints and then dust particles adhere so readily to the glass plates, and, third, the glass, owing to its composition and color, prevents, to an appreciable extent, the passage therethrough of the actinic rays, with the result that a longer time is required for each exposure. The dust particles that adhere to the glass plates, in spite of the most painstaking efforts to keep them clean, causes spots on the enlarged picture, which greatly increases the time and work required for "spotting" which is one of the most important items of expense in making enlarged photographs. By the elimination of glass plates, the time and labor for spotting can be reduced fully seventy-five per cent.

The object of the present invention is to produce means whereby the glass plates, now so extensively employed in holding the film, can be dispensed with and the film negative held flat and straight in the enlarging camera frame.

My improved means, briefly described, consists of a rectangular frame comprising two similar rectangular portions between which the edges of the film are clamped so as to be held straight. I also provide means for locking the frames in assembled or closed position so that they can be freely moved without permitting the film to become loose.

In order to better and more clearly describe my invention, I shall have reference to the accompanying drawing in which:

Fig. 1 is a plan view of my improved projection film holder.

Fig. 2 is a vertical longitudinal section taken on lines 2—2, Fig. 1.

Fig. 3 is a transverse section taken on line 3—3, Fig. 1.

Fig. 4 is a side elevation of the locking members.

Fig. 5 is a plan view of a modified form of frame.

Fig. 6 is a view similar to that shown in Fig. 5, but on a somewhat larger scale, and shows the opposite side to that shown in Fig. 5.

Fig. 7 is a transverse section taken on line 7—7, Fig. 5.

Fig. 8 is a longitudinal section taken on line 8—8, Figs. 5 and 7; and

Fig. 9 is a section taken on line 9—9, Fig. 6.

The same reference numbers will be used to designate the same parts throughout the several views.

Numeral 1 designates a film holding frame as a whole and 2 the film negative. The frame is formed by two plates 3 and 4 which are connected along one side by means of a hinge 5 so that they may be moved from the closed full line position (Fig. 3) to the open or dotted line position shown in the same figure. The two members 3 and 4 are provided with a central rectangular opening 6 whose size varies in accordance with the size of the negative.

In order to clamp the negative in place between the plate, I provide locking members consisting of two bars 7, each of which is provided with a plurality of tongues 8 which are formed integral with the bar by being cut on three sides. These tongues are offset, as shown in Fig. 4. The plates 3 and 4 are provided with openings 9 which register with the corresponding openings in the other plate and serve to receive the locking tongues 8 in the maner shown in Fig. 2. In order to hold the bars 7 onto the plates, I cut from the metal of the plate a plurality of pairs of tongues 10 which are bent upwardly and project over the edges of the bar 7, holding it in place but permitting it to slide. Each bar 7 has near its ends a bent out portion 11 which serves as a means by which the bar may be engaged by the hand and moved.

If we now direct our attention to Fig. 2 we will find that when the bar 7 is in its uppermost position, as shown in this drawing, then the tongues 8 will engage the outer surface of the plate 4 and lock the same against movement about the hinge 5. When it is desired to open the holder for the purpose of removing the film, the bars 7 are moved downwardly as far as they will go. The tongues 8 will then register with the openings 9 and permit the plates to open and move apart, as shown in dotted lines in Fig. 3.

The distance between the inner edge of each bar 7 and the sides of the opening 6 should be as small as possibe so that the clamping action of the bars 7 will be exerted on the film with a maximum efficiency. When the film is of such size that there is not room for the clamping bars along the sides of the frame, in which position they are shown in Fig. 1, then they may be placed at the top and the bottom of the frame.

The frame shown in Figs. 1 to 4 and described above is suitable only for certain sizes of film and cannot be used for films which are substantially as large as the outside of the frame. The outside of the frame or holder is made the same as the largest size film that can be employed in the enlarging camera, which, for the purpose of illustration, we will say is a 5 x 7. When a 5 x 7 film negative is to be used for making an enlarged picture, a frame constructed different from that shown and described must be used. For this purpose I have designed a frame which is shown in Figs. 5 to 8 and which I will now describe in detail.

Since the size of the negative is substantially the same as the opening in the frame of the enlarging camera, it is necessary to so construct the film holder that it will cooperate with a negative of this size and still be small enough to enter the place provided therefor in the enlarging camera. I accomplish this by making the holder of two rectangular framelike parts whose outside dimensions are the same as that of the film, which, in this case, is 5 x 7 inches. Secured to the ends of the frame by any suitable means, such as solder are thin guide strips 14, most clearly shown in Fig. 9. These strips serve to center the two frames in a longitudinal direction. Secured to the sides of the frame 13 are angles 15 which have one side provided with two spaced slots 16 for the reception of screws 17 which hold the strip to the frame 13. It is evident that the strips 15 may move longitudinally to the extent of the length of the slots 16. The ends 18 are bent outwardly as shown in Fig. 8 so as to enable the strips to be moved. The slides 15 have inturned portions 19 which are adapted to pass through correspondingly spaced notches 20 in the frame portions 12 and to engage and hold said frame portions against separation when the strips are in the position shown in Figs. 5 and 6. When the strips 15 are moved downwardly to the extent of the length of the slot 16, the portion 19 will register with the notches 20 in which position the frames are readily separable. The lower end of the frame 12 is notched, as indicated by numeral 21, so that the finger nail or some thin, sharp instrument can be inserted therein for the purpose of lifting the frame part 12. As the strips 15 and the guide strips 14 are very thin (about 1/64 of an inch), the outside dimensions of the frame will be only a very little larger than the size of the film. When a film is to be inserted into the frame shown in Fig. 5 so as to be held in place thereby, the frame portions 12 and 13 are separated. The film is then laid onto the surface of frame 13 between the guides 14 and the movable strips 15, after which the frame portion 12 is put into place and locked by moving the strips 15 to the position shown in Fig. 6. The film will be securely held in place and can be placed in the enlarging camera.

Owing to the fact that there are so many different sizes of films for each size of enlarging camera, it is necessary to furnish the holders in sets, each set consisting of one holder of the type shown in Fig. 5 and one or more holders of the type shown in Fig. 1. Although the two holders shown and described are specifically different, they are broadly the same, as each holder has two substantially identical frame members adapted to engage opposite sides of a film and locking means slidably secured to one of said frame members and adapted to engage and hold the other member. The tongues 8 correspond in function to the inturned portions 19 and the bars 7 to the slides 15.

Having now described my invention, what I claim as new is:

1. A projection film holder comprising, in combination, a pair of substantially identical rectangular frame members, each of which has a central opening, one of said members having spaced openings in each of its opposite sides, a locking member slidably secured to corresponding sides of the other member, said locking member having inwardly projecting portions adapted to register with the openings and to be moved into engagement with the first-mentioned frame to hold it in parallel relation with the other frame member.

2. A projection film holder comprising in combination a pair of substantially identical frame members each of which has a central opening and a plurality of registering aligned openings on each side of the central opening, a locking member slidably connected to one of said frame members, said locking member having a plurality of locking tongues adapted to pass through the aligned openings and to lock the frame members in parallel relation.

3. A projection film holder comprising in combination a pair of substantially identical frame members each of which has a central opening and a plurality of registering aligned openings on each side of the central opening, a locking member slidably connected to one of said frame members, said locking member having a plurality of locking tongues adapted to pass through the aligned openings and to lock the frame members in parallel relation, said locking tongues being L-shaped.

4. A projection film holder comprising in combination a pair of substantially identical frame members each of which has a central opening and a plurality of registering aligned openings on each side of the central opening, a locking member slidably connected to one of said frame members, said locking member having a plurality of locking tongues adapted to pass through the aligned openings and to lock the frame members in parallel relation, said locking tongues being L-shaped, and means integral with one of the frame members engaging said locking member and holding it slidably to said frame member.

5. A projection film holder comprising, in combination a pair of rectangular frame members each of which has a central opening, one of said members having spaced openings in one of its sides, a locking member slidably secured to the corresponding side of the other member, said locking member having spaced inwardly projecting portions adapted to register with the openings and to be moved into engagement with the first-mentioned frame to hold it in parallel relation with the other frame member and means for connecting the opposite sides of the frame members.

In testimony whereof I affix my signature.

JOHN O. ELLINGSON.